US012254866B2

(12) United States Patent
Robichaud et al.

(10) Patent No.: US 12,254,866 B2
(45) Date of Patent: Mar. 18, 2025

(54) SYSTEMS AND METHODS FOR ALIGNING A REFERENCE SEQUENCE OF SYMBOLS WITH HYPOTHESIS REQUIRING REDUCED PROCESSING AND MEMORY

(71) Applicant: Rev.com, Inc., San Francisco, CA (US)

(72) Inventors: Jean-Philippe Robichaud, Mercier (CA); Miguel Jette, Squamish (CA); Joshua Ian Dong, Austin, TX (US); Quinten McNamara, Austin, TX (US); Nishchal Bhandari, Austin, TX (US); Michelle Kai Yu Huang, Austin, TX (US)

(73) Assignee: Rev.com, Inc., San Francisco, CA (US)

( * ) Notice: Subject to any disclaimer, the term of this patent is extended or adjusted under 35 U.S.C. 154(b) by 384 days.

(21) Appl. No.: 17/069,462

(22) Filed: Oct. 13, 2020

(65) Prior Publication Data
US 2022/0115003 A1 Apr. 14, 2022

(51) Int. Cl.
*G10L 15/06* (2013.01)
*G10L 15/14* (2006.01)

(52) U.S. Cl.
CPC .............. *G10L 15/06* (2013.01); *G10L 15/14* (2013.01)

(58) Field of Classification Search
CPC ....... G10L 15/14; G10L 15/06; G10L 15/193; G10L 15/02; G10L 15/18; G10L 15/148; G10L 2015/085; G10L 15/187
See application file for complete search history.

(56) References Cited

U.S. PATENT DOCUMENTS 6,963,837 B1 * 11/2005 Finke .................... G10L 15/187
704/E15.02
8,290,774 B1 * 10/2012 Mohri ................... G06F 40/289
704/9
(Continued)

FOREIGN PATENT DOCUMENTS

CN 103700370 A 4/2014
CN 104485105 A 4/2015
(Continued)

OTHER PUBLICATIONS

International Search Report and Written Opinion dated Jan. 12, 2022 issued in related PCT App. No. PCT/US2021/054620 (6 pages).
(Continued)

*Primary Examiner* — Abdelali Serrou
(74) *Attorney, Agent, or Firm* — Haynes and Boone, LLP

(57) ABSTRACT

A method of determining an alignment sequence between a reference sequence of symbols and a hypothesis sequence of symbols includes loading a reference sequence of symbols to a computing system and creating a reference finite state automaton for the reference sequence of symbols. The method further includes loading a hypothesis sequence of symbols to the computing system and creating a hypothesis finite state automaton for the hypothesis sequence of symbols. The method further includes traversing the reference finite state automaton, adding new reference arcs and new reference transforming properties arcs and traversing the hypothesis finite state automaton, adding new hypothesis arcs and new hypothesis transforming properties arcs. The method further includes composing the hypothesis finite state automaton with the reference finite state automaton creating alternative paths to form a composed finite state automaton and tracking a number of the alternative paths created. The method further includes pruning the alternative (Continued)

paths based on likely top paths, backtracking over most likely paths of the composed finite state automaton, and rescoring edit-distances of the composed finite state automaton.

1 Claim, 4 Drawing Sheets

(56) References Cited

U.S. PATENT DOCUMENTS

| | | | |
|---|---|---|---|
| 9,697,827 B1 | 7/2017 | Lilly et al. | |
| 9,966,066 B1* | 5/2018 | Corfield | G10L 15/142 |
| 10,109,274 B2* | 10/2018 | Nagao | G10L 15/193 |
| 11,398,236 B2* | 7/2022 | Secker-Walker | G10L 15/1822 |
| 2003/0009335 A1 | 1/2003 | Schalkwyk et al. | |
| 2008/0307435 A1* | 12/2008 | Rehman | G06F 9/542 |
| | | | 719/318 |
| 2011/0302489 A1 | 12/2011 | Zimmerman | |
| 2012/0059656 A1 | 3/2012 | Garland et al. | |
| 2013/0166285 A1 | 6/2013 | Chang et al. | |
| 2014/0074467 A1 | 3/2014 | Ziv et al. | |
| 2014/0136210 A1* | 5/2014 | Johnston | G10L 15/07 |
| | | | 704/275 |
| 2014/0163959 A1* | 6/2014 | Hebert | G06F 16/3344 |
| | | | 704/9 |
| 2015/0255069 A1* | 9/2015 | Adams | G10L 15/187 |
| | | | 704/236 |
| 2016/0217792 A1 | 7/2016 | Gorodetski | |
| 2016/0283185 A1 | 9/2016 | McLaren et al. | |
| 2017/0053653 A1* | 2/2017 | Sidi | G10L 17/04 |
| 2017/0372706 A1 | 12/2017 | Shepstone et al. | |
| 2018/0211670 A1* | 7/2018 | Gorodetski | G10L 17/04 |
| 2020/0388282 A1* | 12/2020 | Secker-Walker | G10L 15/22 |
| 2021/0201913 A1* | 7/2021 | Zelenko | G10L 15/18 |

FOREIGN PATENT DOCUMENTS

| | | |
|---|---|---|
| CN | 107210038 A | 9/2017 |
| WO | 2018009969 A1 | 1/2018 |

OTHER PUBLICATIONS

International Search Report and Written Opinion dated Mar. 3, 2020 issued in PCT App. No. PCT/US19/58870 (19 pages).

Office Action dated Aug. 10, 2023 issued in Chinese patent application No. 201980070755.X (15 pages).

* cited by examiner

SYSTEMS AND METHODS FOR ALIGNING A REFERENCE SEQUENCE OF SYMBOLS WITH HYPOTHESIS REQUIRING REDUCED PROCESSING AND MEMORY

BACKGROUND

In speech recognition like in many other fields, the need to align two sequences of elements with the least cost frequently occurs. The most primitive formulation of this problem is to do alignment between two different strings of characters and find the way to perform the alignment that requires the minimal number of transformations.

In the context of speech recognition, it is often the case that there will be an audio file registering one or many utterances from one or many speakers and the text transcription of these utterances. The job of an automatic speech recognition engine (ASR) is to also extract the textual transcript of the utterances given the content of the audio file. Of course, scientists and engineers are often looking to estimate the word error rate of the ASR. To achieve that, one needs to find the best alignment possible between the original transcription of the audio and the ASR output and computes the number of "edits" required to go from the reference text and the hypothesis produced.

Another use of the alignment is to get timings for each word in the audio. In this way, the transcript may be aligned with the audio in the form of subtitles. Given the hypothesis coming out of the ASR with their timings, aligning the hypothesis sequence of symbols with the reference text allows to have a good idea of when each reference word can be found in the audio file. This serves multiple purposes in the speech science world.

Several complexities arise when the typical techniques are used (see below) especially when the transcriptions are provided in a format that introduces ambiguities. For example, if the transcription of an utterance contains the following text "this car cost me $20,000", it is possible that the ASR would come back with "this car cost me twenty grand" or "this car cost me twenty k" or "this car cost me twenty thousand" or "this car cost me twenty thousand dollars". If one wants to perform a proper alignment of the words, all these have to be taken into consideration.

It is to be noted that while the above text talks about aligning two strings of text, the problem is more general and is more properly described as the task to align two graphs of symbols.

The current solutions available are limiting for two reasons: either they produce a perfect alignment but can't deal with very long utterances because they start to consume too much time and too much memory or they are very quick but would produce imperfect alignments in many situations. These last techniques are sufficient to compute a word error rate (the number of edits is likely correct) but would miss completely how words should be aligned in the case of long utterances with a reasonably high word error rate (large edit distances). Also, none of these techniques allow to automatically account for ambiguities in the transcriptions: they assume that no transformation of either input is required.

The literature generally considers this a solved problem, pushing the burden of getting perfect transcriptions onto the research or the data providers. In general, no solution is provided for the ambiguity in the references and no general solutions either to attribute different weights to errors.

The classic Levenshtein distance and alignments algorithms have stayed pretty much the same over the years. It is generally the most efficient approach but doesn't support alternatives in reference or hypothesis strings. Generally, for short strings, people go with generating all the possible alternatives and run the comparison multiple times before picking the lowest edit distance reported. This isn't tractable for long text where many alternatives are possible frequently in the text.

Solutions based on finite state acceptors or transducers like what is implemented in Kaldi's (kaldi-asr.org) lattice-oracle algorithm suffer from the problem of exploding computation time and memory exhaustion when the text to compare is long and the error rate relatively high.

Finally, bioinformatics also have specialized techniques to perform alignments on huge sequences of tokens (like the modified Needleman-Wunsch or the Shotgun sequencing), but they do not address the problem of alternatives either.

Finally, in all these techniques, the best one can expect is to have an alignment of the reference sequence with a hypothesis sequence. No extra details related to specific sections of the sequences (for example, we could be interested in how certain expressions specifically are aligned) would be available without further post-processing.

BRIEF SUMMARY

In one embodiment, a method of determining an alignment sequence between a reference sequence of symbols and a hypothesis sequence of symbols includes loading a reference sequence of symbols to a computing system and creating a reference finite state automaton for the reference sequence of symbols. Metadata information about each symbol or word of the reference is also embedded into that finite state representation. The method further includes loading a hypothesis sequence of symbols to the computing system and creating a hypothesis finite state automaton for the hypothesis sequence of symbols, along with meta-data information in many scenarios. The method further includes traversing the reference finite state automaton, adding new reference arcs and new reference transforming properties arcs and traversing the hypothesis finite state automaton, adding new hypothesis arcs and new hypothesis transforming properties arcs. The method further includes composing the hypothesis finite state automaton with the reference finite state automaton creating alternative paths to form a composed finite state automaton and tracking a number of the alternative paths created. The method further includes pruning the alternative paths based on likely top paths, backtracking over most likely paths of the composed finite state automaton, and rescoring edit-distances of the composed finite state automaton. In one alternative, the method further includes loading a reference sequence of symbols meta-data and creating arcs in the reference finite state automaton for the reference sequence of symbols meta-data. Alternatively, the reference sequence of symbols meta-data is representative of at least one property of the reference sequence of symbols. In another alternative, each arc of the reference finite state automaton represents a word. In another alternative, the method further includes loading hypothesis sequence of symbols meta-data and creating arcs in the hypothesis finite state automaton for the hypothesis sequence of symbols meta-data, wherein the hypothesis sequence of symbols meta-data is representative of at least one property of the hypothesis sequence of symbols and each arc of the hypothesis finite state automaton represents a word. Alternatively, the pruning uses beam search pruning methodology. In another alternative, the method further includes determining an alignment sequence based on the edit-distances of the composed finite state automaton. Alternatively, the new hypothesis arcs and the new reference arcs are alternative possible word representations. In another alternative, the new hypothesis transforming properties and the new reference transforming properties are alternative word properties such as case and style.

In one embodiment, a system for determining an alignment sequence between a reference sequence of symbols and a hypothesis sequence of symbols includes a processing module executing code and configured to load a reference sequence of symbols to a computing system. The processing module is further configured to create a reference finite state automaton for the reference sequence of symbols. The processing module is further configured to load a hypothesis sequence of symbols to the computing system. The processing module is further configured to create a hypothesis finite state automaton for the hypothesis sequence of symbols. The processing module is further configured to traverse the reference finite state automaton, adding new reference arcs and new reference transforming properties. The processing module is further configured to traverse the hypothesis finite state automaton, adding new hypothesis arcs and new hypothesis transforming properties. The processing module is further configured to compose the hypothesis finite state automaton with the reference finite state automaton creating alternative paths to form a composed finite state automaton. The processing module is further configured to track a number of the alternative paths created. The processing module is further configured to prune the alternative paths based on likely top paths. The processing module is further configured to backtrack over most likely paths of the composed finite state automaton. The processing module is further configured to rescore edit-distances of the composed finite state automaton. In one alternative, the processing module is further configured to load a reference sequence of symbols meta-data and create arcs in the reference finite state automaton for the reference sequence of symbols meta-data. Alternatively, the reference sequence of symbols meta-data is representative of at least one property of the reference sequence of symbols. In another alternative, each arc of the reference finite state automaton represents a word. Alternatively, the processing module is further configured to load hypothesis sequence of symbols meta-data and create arcs in the hypothesis finite state automaton for the hypothesis sequence of symbols meta-data, wherein the hypothesis sequence of symbols meta-data is representative of at least one property of the hypothesis sequence of symbols and each arc of the hypothesis finite state automaton represents a word. In another alternative, the processing module is further configured to determine an alignment sequence based on the edit-distances of the composed finite state automaton.

In another embodiment, a system for determining an alignment sequence between a reference sequence of symbols and a hypothesis sequence of symbols includes a loading module executing code and configured to load a reference sequence of symbols to a computing system and load a hypothesis sequence of symbols to the computing system. The system further includes a finite state automaton module executing code and configured to create a reference finite state automaton for the reference sequence of symbols and create a hypothesis finite state automaton for the hypothesis sequence of symbols. The system further includes a traversing module executing code and configured to traverse the reference finite state automaton, adding new reference arcs and new reference transforming properties and traverse the hypothesis finite state automaton, adding new hypothesis arcs and new hypothesis transforming properties. The system further includes a composing module, executing code and configured to compose the hypothesis finite state automaton with the reference finite state automaton creating alternative paths to form a composed finite state automaton, track a number of the alternative paths created, and prune the alternative paths based on likely top paths. The system further includes a scoring module, executing code and configured to backtrack over most likely paths of the composed finite state automaton, rescore edit-distances of the composed finite state automaton, and determine an alignment sequence based on the edit-distances of the composed finite state automaton. In one alternative, the scoring module is further configured to determine an alignment sequence based on the edit-distances of the composed finite state automaton.

In another embodiment, a non-transitory digital storage medium having a computer program stored thereon to perform a method for determining an alignment sequence between a reference sequence of symbols and a hypothesis sequence of symbols, the method including loading a reference sequence of symbols to a computing system and creating a reference finite state automaton for the reference sequence of symbols. The method further includes loading a hypothesis sequence of symbols to the computing system and creating a hypothesis finite state automaton for the hypothesis sequence of symbols. The method further includes traversing the reference finite state automaton, adding new reference arcs and new reference transforming properties arcs and traversing the hypothesis finite state automaton, adding new hypothesis arcs and new hypothesis transforming properties arcs. The method further includes composing the hypothesis finite state automaton with the reference finite state automaton creating alternative paths to form a composed finite state automaton and tracking a number of the alternative paths created. The method further includes pruning the alternative paths based on likely top paths, backtracking over most likely paths of the composed finite state automaton, and rescoring edit-distances of the composed finite state automaton. In one alternative, the method further includes a loading reference sequence of symbols meta-data and creating arcs in the reference finite state automaton for the reference sequence of symbols meta-data. Alternatively, the reference sequence of symbols meta-data is representative of at least one property of the reference sequence of symbols. In another alternative, each arc of the reference finite state automaton represents a word. In another alternative, the method further includes loading hypothesis sequence of symbols meta-data and creating arcs in the hypothesis finite state automaton for the hypothesis sequence of symbols meta-data, wherein the hypothesis sequence of symbols meta-data is representative of at least one property of the hypothesis sequence of symbols and each arc of the hypothesis finite state automaton represents a word. Alternatively, the pruning uses beam search pruning methodology. In another alternative, the method further includes determining an alignment sequence based on the edit-distances of the composed finite state automaton. Alternatively, the new hypothesis arcs and the new reference arcs are alternative possible word representations. In another alternative, the new hypothesis transforming properties and the new reference transforming properties are alternative word properties such as case and style.

DETAILED DESCRIPTION

Certain terminology is used herein for convenience only and is not to be taken as a limitation on the embodiments of the systems and methods for aligning reference sequence of symbols with hypothesis sequence of symbols requiring reduced processing and memory. In many embodiments, a reference sequence of symbols and a hypothesis sequence of symbols are cross-referenced. This is performed by first depicting the reference sequence of symbols and the hypothesis sequence of symbols as a finite state automaton (FSA). Additional arcs are added as needed to the FSAs. This provides for alternatives and transforming properties. In many scenarios, this may account for different pronunciations or different ways of transcribing the same text. Subsequently, the two FSAs are composed as is performed in finite state machine (FSM) analysis. In the context of FSA/FSM to compose means to create new states by unifying the states of the existing FSAs. In other words, the new FSA is formed by combining each of the states of one FSA with each of the states of the other FSA and then add arcs to each state such that inputs will traverse the same course (such that inputs will affect each combined state in the same way in previously did). Once the FSA are composed, an alignment sequence is determined based the edit-distances of the composed finite state automaton, with the shorter edit distances being the preferential alignment. Note that the explicit creation of a FSA is not necessary in all embodiments. The point is to have two sets of text and determine from one word to the next is aligned with the other. This is accomplished by from one word to the next determining the next possible word options and traversing (in other words considering) all of these possible word option combinations, to determine which ones have the least edit distances. In many embodiments, the sequences of symbols are text strings, such as a reference text and a hypothesis text. In this scenario, these sequences of symbols may represent transcribed or translated speech.

Figure 1:
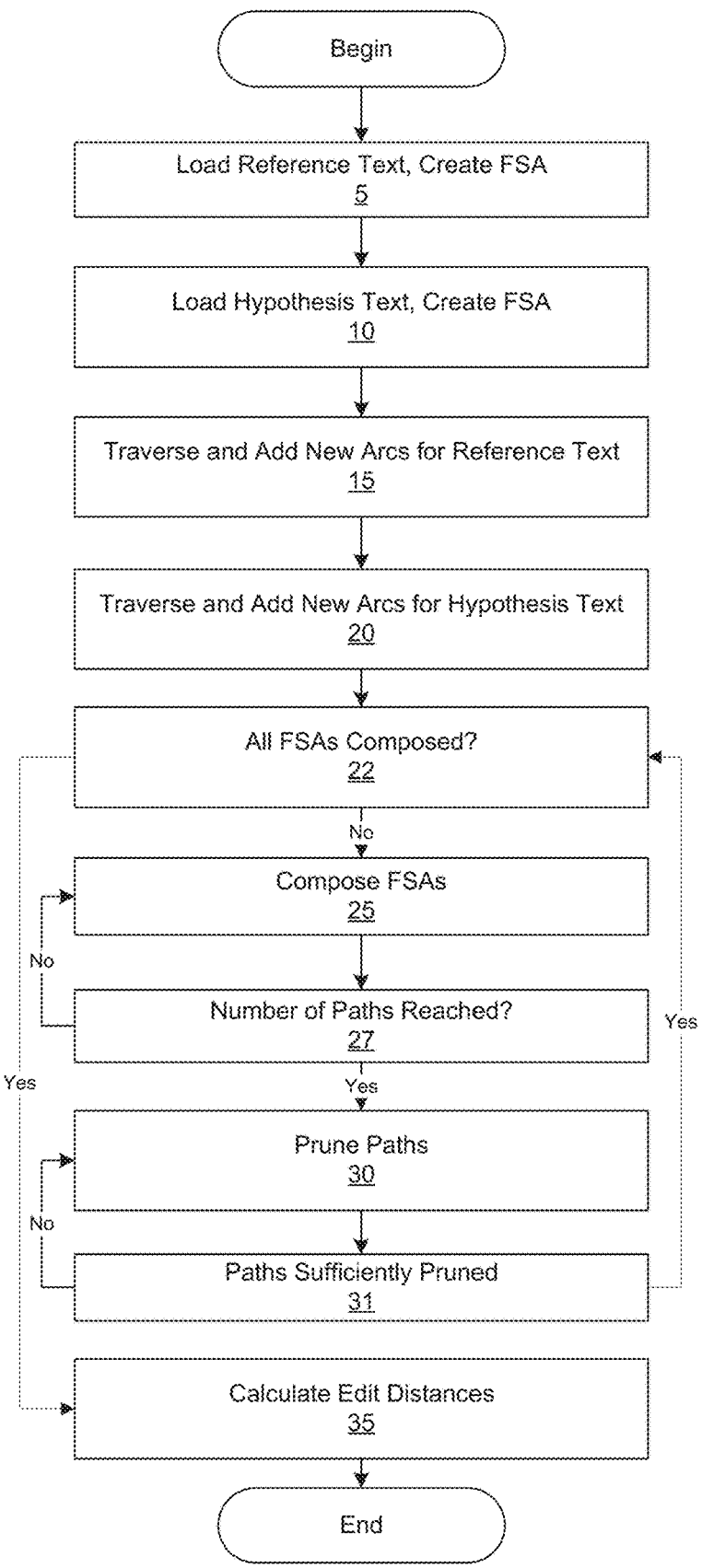
FIG. 1 shows a flowchart for the operation of one embodiment a method for aligning reference sequence of symbols with hypothesis sequence of symbols.

FIG. 1 shows a flowchart for the operation of one embodiment of the system. In step 5, the system loads the reference sequence of symbols with its meta-data, creates an FSA with one word per arc and also makes arcs with properties. In this scenario, the arcs will represent words and the properties may represent additional properties of the text, which may include such things such as capitalization, style, or other text property. In step 10, the system loads the hypothesis sequence of symbols with its meta-data, creates an FSA with one word per arc (with arcs for properties as well). In step 15, the system traverses the reference FSA, adding new arcs over one or multiple original arcs to add alternatives and transforming properties as required. In many contexts, this means a particular word may be expressed in different ways, so that word may need to be expressed as multiple arcs; e.g. ten dollars and $10. In step 20, similar to step 15, the system traverses the hypothesis FSA, adding new arcs and transforming properties as required. In step 22, the system checks to see if all FSAs have been composed. If no, then in step 25, the system starts to compose (in the FSM terminology sense) the reference with the hypothesis FSA. Composition as explained above involves combining each of the states of one FSA with each of the states of the other FSA and then add arcs to each state such that inputs will traverse the same course (such that inputs will affect each combined state in the same way it previously did). The system tracks the edit cost of the many alternatives during the composition. When a certain number of paths is reached in step 27, the system, in step 30, starts pruning the paths based on beam search pruning methodology. This approach is similar to the pruned-Viterbi approach, and in alternatives the pruned-Viterbi approach may be used. Alternatively, different pruning approaches may be used, with the objective being to reduce the number of paths, according to a path being a likely path. If the paths are sufficiently pruned in step 31, then the flow returns to step 22. If not, then the flow returns to step 30 and pruning continues. Once all the FSAs are composed, the system goes to step 35. In step 35, once the whole sequences have been composed, the system backtracks the top N paths and rescore the edit distances. Edit distance is a way of quantifying how dissimilar two strings (e.g., words) are to one another by counting the minimum number of operations required to transform one string into the other. In other words, once a certain number of active paths have been reached, say X1, pruning occurs to try to reduce them to at most X2 where X2 is much smaller than X1. Once pruning is complete, composition resumes until X1 paths are active again or the composition operation is done. Only then backtracking occurs and the computation of the real edit distance is performed. There are many alternatives for calculating edit distances and a variety may be used in this scenario. Based on the path with the lowest edit distance, this path is selected as the "perfect" alignment or best alignment.

Embodiments of the system can align very long sequences (graphs) of symbols (e.g. strings of words) with long noisy sections without exhausting RAM or taking an unreasonable amount of time. One drawback may be that embodiments of the system don't assume that all edits have the same cost. Embodiments can support lists of multi-tokens alternatives acceptable for alignments, which may be implemented via alternative arcs between states. Additionally, embodiments preserve metadata on the reference and hypothesis sequences in the final alignment produced.

Figure 2:
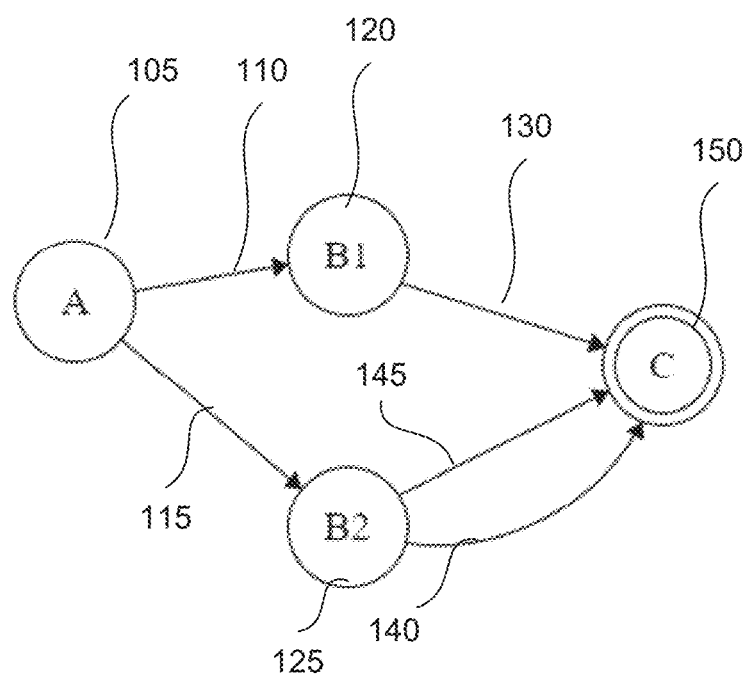
FIG. 2 shows a generic model of one embodiment of a FSA for speech.

FIG. 2 shows a generic model of a FSA for speech. As previously identified, this model may be applied to any sequence of elements. By way of example, this FSA may represent a single word with two syllables, such as "water." Water may be pronounced "wah-ter", "wooder", or "wooter". From initial state A 105, arc 110 represented the "wah" sound, and arc 115 represents the "woo" sound. If the reference sequence of symbols includes a representation of either, then the FSA proceeds to state B1 120 and B2 125 respectively. Then if the sound is a "ter" 130, a "der" 140, or a "ter" 145 the FSA advances to state 150, where it determines the word said was water.

Figure 3:
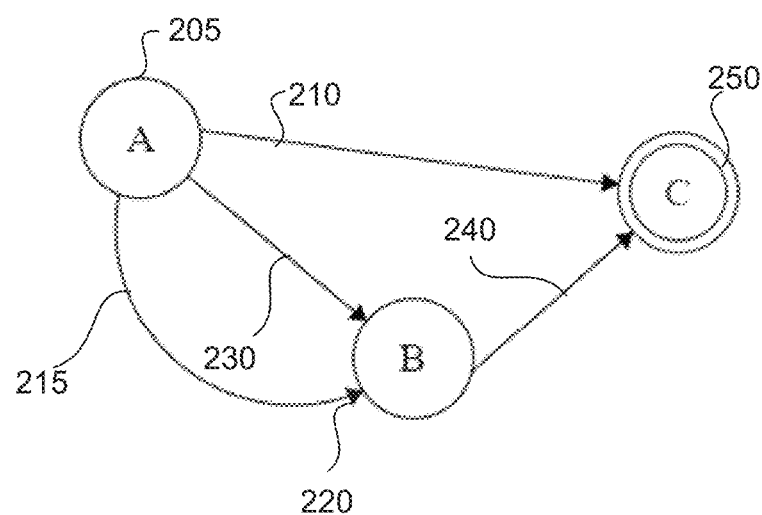
FIG. 3 shows one embodiment of a text-based FSA for a reference sequence of symbols.

In the context of FIG. 2, for the textual words, FIG. 3 shows a text-based FSA for "one dollar". From state 205 if the string is $1 according arc 210 then the arc is traversed to state 250. If the string is "one" arc 215 is traversed to state 220. Or if the string is "won" arc 230 is traversed to state 220. Certain arcs may have been added during step 15 of the method of FIG. 1, such as the homonym "won" for "one". If the string is "dollar" then arc 240 is traversed to state 250. The FSA of FIG. 3 is an example of a reference sequence of symbols FSA.

Figure 4:
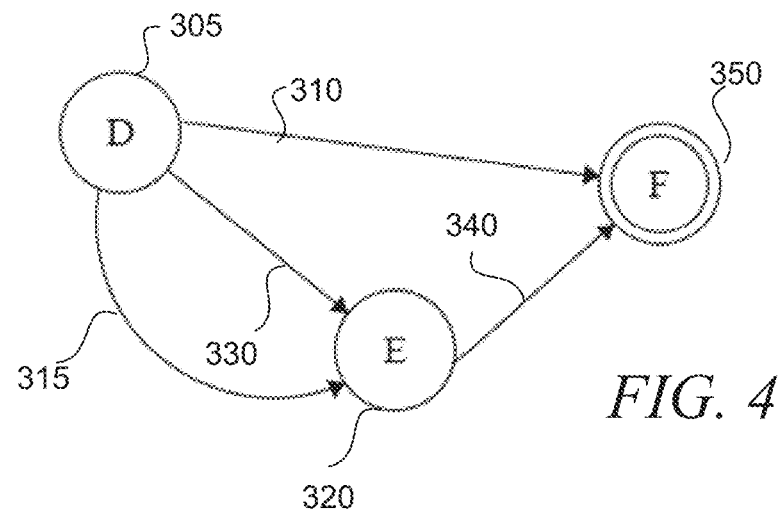
FIG. 4 shows one embodiment of a text-based FSA for a hypothesis sequence of symbols.

FIG. 4 shows a text-based FSA for "one dollar", which is an example of a hypothetical text FSA. From state 305 if the string is $1 according arc 310 then the arc is traversed to state 350. If the string is "one" arc 315 is traversed to state 320. Or if the string is "won" arc 330 is traversed to state 320. Certain arcs may have been added during step 20 of the method of FIG. 1. If the string is "dollar" then arc 340 is traversed to state 350.

Figure 5:
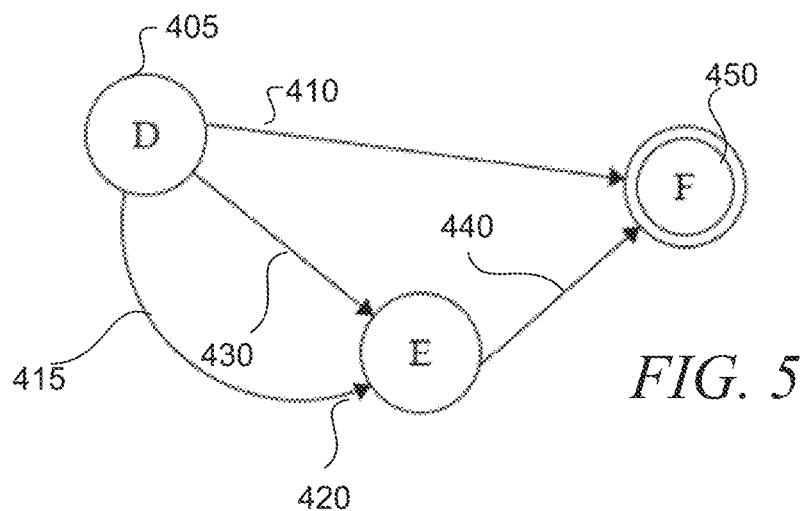
FIG. 5 shows one embodiment of a composed FSA.

FIG. 5 shows an example of a composed FSA after pruning. From state 405 if the string is $1 according arc 410 then the arc is traversed to state 450. If the string is "one" arc 315 is traversed to state 420. Or if the string is "won" arc 430 is traversed to state 420. If the string is "dollar" then arc 440 is traversed to state 450. In certain scenarios, the reference and hypothetical FSAs may vary leading to different results for the composed FSA. In some scenarios, the text may be somewhat different between the FSAs. For instance, instead of "$1" the text may be "$1.00" leading to the addition of an additional arc is step 15 or 20 of FIG. 1.

In many scenarios, the system and/or method may be implemented in modules. Modules may be software-based structures or hardware-based structures, or a combination thereof. Modules may include loading modules for loading text, either reference or hypothetical, finite state automaton modules for creating FSAs, traversing modules for traversing the FSAs, composing modules for composing FSAs, pruning modules for pruning the FSAs, and scoring modules for scoring edit distances in FSAs. Additional modules, such as processing modules may be included or combined with other modules.

Additionally, it is important to note, that in some embodiments, the term FSA is used for convenience to describe the data structures created and how they operate and an actual FSA need not be created or identified. Instead a point of the structure is to create the opportunity to compare strings of text, such that text may be aligned and alignment possibilities of two text strings may be explored, yielding a "perfect" alignment that requires the minimum numbers of edits.

In many embodiments, parts of the system are provided in devices including microprocessors. Various embodiments of the systems and methods described herein may be implemented fully or partially in software and/or firmware. This software and/or firmware may take the form of instructions contained in or on a non-transitory computer-readable storage medium. Those instructions then may be read and executed by one or more processors to enable performance of the operations described herein. The instructions may be in any suitable form such as, but not limited to, source code, compiled code, interpreted code, executable code, static code, dynamic code, and the like. Such a computer-readable medium may include any tangible non-transitory medium for storing information in a form readable by one or more computers such as, but not limited to, read only memory (ROM); random access memory (RAM); magnetic disk storage media; optical storage media; a flash memory, etc.

Embodiments of the systems and methods described herein may be implemented in a variety of systems including, but not limited to, smartphones, tablets, laptops, and combinations of computing devices and cloud computing resources. For instance, portions of the operations may occur in one device, and other operations may occur at a remote location, such as a remote server or servers. For instance, the collection of the data may occur at a smartphone, and the data analysis may occur at a server or in a cloud computing resource. Any single computing device or combination of computing devices may execute the methods described.

In various instances, parts of the method may be implemented in modules, subroutines, or other computing structures. In many embodiments, the method and software embodying the method may be recorded on a fixed tangible medium.

While specific embodiments have been described in detail in the foregoing detailed description, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof.

What is claimed as new and desired to be protected by Letters Patent of the United States is:

1. A system for determining an alignment sequence between a reference sequence of symbols and a hypothesis sequence of symbols, the system comprising:
   a loading module executing code and configured to:
      load a reference sequence of symbols to a computing system;
      load a hypothesis sequence of symbols to the computing system;
      load a reference sequence of symbols meta-data;
      load hypothesis sequence of symbols meta-data;
   a finite state automaton module executing code and configured to:
      create a reference finite state automaton for the reference sequence of symbols;
      create a hypothesis finite state automaton for the hypothesis sequence of symbols;
   a traversing module executing code and configured to:
      traverse the reference finite state automaton, adding new reference arcs and new reference transforming properties;
      create arcs in the reference finite state automaton for the reference sequence of symbols meta-data;
      create arcs in the hypothesis finite state automaton for the hypothesis sequence of symbols meta-data, wherein the hypothesis sequence of symbols meta-data is representative of at least one property of the hypothesis sequence of symbols and each arc of the hypothesis finite state automaton represents a word;
      traverse the hypothesis finite state automaton, adding new hypothesis arcs and new hypothesis transforming properties;
   a composing module, executing code and configured to:
      compose the hypothesis finite state automaton with the reference finite state automaton creating alternative paths to form a composed finite state automaton;
      track a number of the alternative paths created;
      prune the alternative paths based on likely top paths;
   a scoring module, executing code and configured to:
      backtrack over most likely paths of the composed finite state automaton;
      rescore edit-distances of the composed finite state automaton;
      determine an alignment sequence of the reference sequence of symbols and the reference sequence of symbols meta-data based the edit-distances of the composed finite state automaton; wherein the reference sequence of symbols meta-data is representative of at least one property of the reference sequence of symbols, the reference sequence of symbols is representative of one of transcribed speech and translated speech, and each arc of the reference finite state automaton represents a word.

\* \* \* \* \*